United States Patent
Ohara

(10) Patent No.: US 8,585,386 B2
(45) Date of Patent: Nov. 19, 2013

(54) TIRE MOLD, METHOD OF MANUFACTURING PNEUMATIC TIRE AND PNEUMATIC TIRE

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 337 days.

(21) Appl. No.: 13/103,340

(22) Filed: May 9, 2011

(65) Prior Publication Data

US 2011/0297288 A1    Dec. 8, 2011

(30) Foreign Application Priority Data

Jun. 2, 2010 (JP) .................................. 2010-126975

(51) Int. Cl.
*B29C 33/42* (2006.01)

(52) U.S. Cl.
USPC ......................................... 425/28.1

(58) Field of Classification Search
USPC ................................ 425/28.1, 470
See application file for complete search history.

(56) References Cited

FOREIGN PATENT DOCUMENTS

JP       6106921 A       4/1994
JP       2003-300214    * 10/2003

* cited by examiner

*Primary Examiner* — James Mackey
(74) *Attorney, Agent, or Firm* — Fish & Richardson P.C.

(57) ABSTRACT

A tire mold has a tire molding surface and a rough surface molding portion provided in the tire molding surface. In the rough surface molding portion, a maximum height Rz is not less than 4 μm, a material ratio Rmr(c) in a case where 20% of the maximum height Rz is set to a cutting level c is not less than 3.5%, and a material ratio Rmr(c) in a case where 30% of the maximum height Rz is set to the cutting level c is not more than 25%.

2 Claims, 3 Drawing Sheets

TIRE MOLD, METHOD OF MANUFACTURING PNEUMATIC TIRE AND PNEUMATIC TIRE

BACKGROUND OF THE INVENTION

1. Field of the Invention

The present invention relates to a tire mold for cure molding a tire, a manufacturing method of a pneumatic tire using the tire mold, and the pneumatic tire.

2. Description of the Related Art

In cure molding of a tire, an outer surface of an uncured tire is likely to be stuck to a tire molding surface of a tire mold, and an adhesive failure as shown in FIG. 6 may be generated by a rubber flow defect caused thereby. The adhesive failure is recognized as a region which is continuously peeled or depressed in a circumferential direction in the tire outer surface, and is remarkably generated particularly in a side wall portion. Further, such a rubber flow defect promotes an air residual between the tire molding surface and the tire outer surface, and causes a molding sink called a lightness or a bare generated on the outer surface of the cured tire.

In Japanese Unexamined Patent Publication No. H06-106921, there is described a pneumatic tire structured such that an outer surface of a side wall portion is partitioned into a plurality of fan-shaped regions which are adjacent in a circumferential direction, and a difference of surface roughness is made equal to or more than 50 µm between the adjacent fan-shaped regions, for making inconspicuous a stripe-like irregularity trace generated by a joint portion of a carcass ply. Further, the publication No. H06-106921 describes changing a surface roughness of a tire molding surface of a tire mold for molding such a tire, and it is considered to be possible to improve a flow property of the rubber by suppressing an adhesion of an uncured tire at the time of cure molding, as far as the surface roughness corresponding to the fan-shaped region is rough.

However, in the tire mold mentioned above, since a micro convex portion included in the region in which the surface roughness is rough forms a micro concave portion which is deep and sharp to the tire side, a strain tends to be concentrated to the portion, and there is a problem that it becomes a starting point of the crack on the tire outer surface. However, if the surface roughness of the region is lowered, it has an effect on prevention of a crack, however, since a flow resistance of the uncured rubber with respect to the tire molding surface is increased, a rubber flow defect is generated at the time of the cure molding and an appearance fault such as an adhesive failure or the like is generated. As mentioned above, with regard to the surface roughness of the tire molding surface, it has been difficult to secure the flow property of the rubber and to prevent the crack on the tire outer surface at the same time.

SUMMARY OF THE INVENTION

The present invention has been made in view of the above situation, and an object of the present invention is to provide a tire mold which can prevent a crack in a tire outer surface while securing a flow property of a rubber, a manufacturing method of a pneumatic tire and the tire mold.

As a result of devoting himself to study, the present inventor has found that it is possible to effectively prevent a crack on a tire outer surface while securing a flow property of rubber by providing a rough surface molding portion in which a maximum height Rz and a material ratio Rmr(c) are set to specific ranges, in a tire molding surface of a tire mold. The present invention is made based on such technical knowledge, and the above object is achieved based on the following structure.

That is, a tire mold in accordance with the present invention comprises a tire molding surface and a rough surface molding portion provided in the tire molding surface, wherein the rough surface molding portion is structured such that a maximum height Rz is not less than 4 µm, a material ratio Rmr(c) in a case where 20% of the maximum height Rz is set to a cutting level c is not less than 3.5%, and a material ratio Rmr(c) in a case where 30% of the maximum height Rz is set to the cutting level c is not more than 25%.

In this tire mold, since the maximum height Rz is set to be not less than 4 µm and the material ratio Rmr(c) in the case where 30% of the maximum height Rz is set to a cutting level c (hereinafter, material ratio Rmr (c: Rz30%)) is not more than 25%, in the rough surface molding portion of the tire molding surface, the rough surface molding portion is formed correspondingly rough, and it is possible to secure the flow property of the rubber while suppressing adhesion of uncured rubber. At the same time, since a material ratio Rmr(c) in the case where 20% of the maximum height Rz is set to the cutting level c (hereinafter, material ratio Rmr (c: Rz20%)) is not less than 3.5%, sharpness of a micro convex portion included in the rough surface molding portion is suppressed, in cooperation with the fact that the material ratio Rmr (c: Rz30%) is not more than 25%. As a result, a micro concave portion formed in a tire side becomes gentle, and it is possible to effectively prevent a crack from being generated in an outer surface of the tire.

The maximum height Rz and the material ratio Rmr(c) in the present invention respectively correspond to the maximum height roughness Rz and the material ratio of the profile defined in JISB0601:2001, and are based on the regulation. Further, rules and procedures for an assessment and characteristics of instruments are based on the provisions of JISB0633:2001 and JISB0651:2001. A sampling length and an evaluation length are defined in correspondence to a surface texture of the rough surface molding portion, and in the case where the maximum height Rz is equal to or less than 10 µm, the sampling length is 0.8 mm, the evaluation length is 4 mm, in the case where the maximum height Rz exceeds 10 µm and is equal to or less than 50 µm, the sampling length is 2.5 mm, the evaluation length is 12.5 mm, and in the case where the maximum height Rz exceeds 50 µm, the sampling length is 8 mm, the evaluation length is 40 mm.

In the tire mold in accordance with the present invention, it is preferable that the rough surface molding portion is formed in a region molding a side wall portion of the tire molding surface. Since a rubber flow defect tends to be generated in a region molding a side wall portion of the tire molding surface, it is possible to effectively prevent generation of an adhesive failure by forming the rough surface molding portion in the region, and thereby the present invention becomes practical.

Further, a manufacturing method of the pneumatic tire according to the present invention comprises a step of cure molding the tire by using the tire molds described above. In this method, it is possible to inhibit the appearance fault such as the adhesion defect due to the rubber flow defect or the like from being generated, by the tire molding surface provided with the rough surface molding portion as mentioned above. Further, it is possible to effectively prevent the crack on the outer surface of the tire by suppressing the sharpness of the micro convex portion included in the rough surface molding portion and making the micro concave portion formed in the tire side gentler.

Further, a pneumatic tire in accordance with the present invention comprises an outer surface and a rough surface portion provided in the outer surface, wherein the rough surface portion is structured such that a maximum height Rz is not less than 4 μm, a material ratio Rmr(c) in a case where 20% of the maximum height Rz is set to a cutting level c is not less than 3.5%, and a material ratio Rmr(c) in a case where 30% of the maximum height Rz is set to the cutting level c is not more than 25%, with regard to a positively and negatively inverted roughness profile.

In this pneumatic tire, since the maximum height Rz is not less than 4 μm, and the material ratio Rmr (c: Rz30%) in a positively and negatively inverted roughness profile is not more than 25%, in the rough surface portion of the outer surface, the flow property of the rubber is secured at the time of cure molding, and an appearance fault such as the adhesive failure or the like is prevented. At the same time, since the material ratio Rmr (c: Rz20%) in the positively and negatively inverted roughness profile is not less than 3.5%, sharpness of the micro concave portion on the tire outer surface becomes gentle, in cooperation with the fact that the material ratio Rmr (c: Rz30%) is not more than 25%, and it is possible to effectively prevent the crack from being generated.

The positively and negatively inverted roughness profile indicates a roughness profile in which positive and negative are inverted, by inverting the roughness profile on the tire outer surface at a roughness mean line (an X-axis). Accordingly, Rmr(c) with regard to the positively and negatively inverted roughness profile is evaluated based on a roughness profile in which a substance side is reversed, in such a manner that the micro convex portion on the tire outer surface becomes the micro concave portion, and the micro concave portion becomes the micro convex portion.

In the pneumatic tire in accordance with the present invention, it is preferable that the rough surface portion is formed in an outer surface of a side wall portion. Since the adhesive failure is significantly generated on the outer surface of the side wall portion due to the rubber flow defect, it is possible to effectively prevent the generation of the adhesive failure by forming the rough surface portion at the position.

DETAILED DESCRIPTION OF THE PREFERRED EMBODIMENTS

Figure 1:
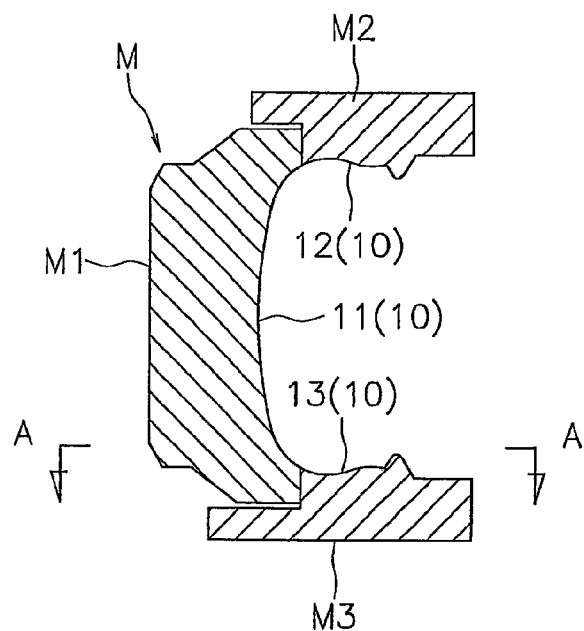
FIG. 1 is a vertical cross sectional view schematically showing an example of a tire mold according to the present invention.

An embodiment of the present invention will be explained with reference to the drawings. FIG. 1 shows a schematic cross sectional view of a tire mold M (hereinafter, referred to as mold M) as a cure metal mold for a tire. At the time of the cure molding, the uncured tire is set to the mold M by setting the tire axial direction to up and down, and the outer surface of the tire is brought into contact with the tire molding surface 10. The mold M is provided with a tread mold portion M1 for molding the tread portion, and side mold portions M2 and M3 for molding the side wall portions, and inner surfaces 11 to 13 of the respective mold portions construct the tire molding surface 10. Although not illustrated, an irregularity shape corresponding to the tread pattern is formed in the inner surface 11 of the tread mold portion M1.

Figure 2:
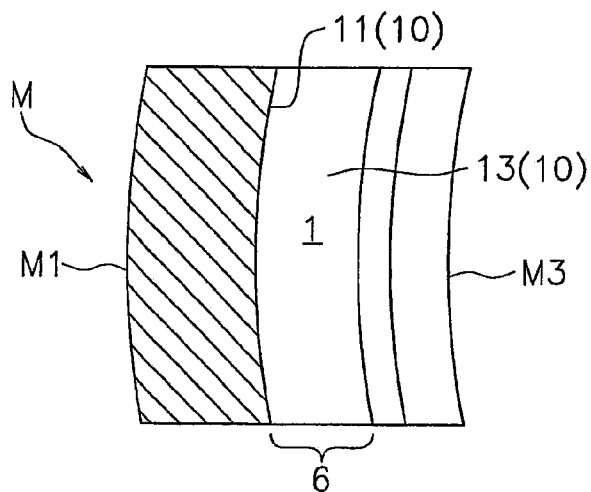
FIG. 2 is a cross sectional view as seen from an arrow A-A in FIG. 1.

The mold M is provided with the rough surface molding portion in which the maximum height Rz and the material ratio Rmr(c) are set to the specific ranges, in the tire molding surface 10. The rough surface molding portion is provided at least a part of the tire molding surface 10, and is preferably formed in an annular region along a tire circumferential direction. In the present embodiment, as shown in FIG. 2, the rough surface molding portion 1 is formed in the region 6 for molding the side wall portion in the lower side of the tire molding surface 10, and the region 6 extends over a part of the inner surface 11 of the tread mold portion M1 and the inner surface 13 of the side mold portion M3. There is a case where a design such as a logo or a side protector is formed in the region, however, the rough surface molding portion 1 may be formed optionally therein.

In the rough surface molding portion 1, a maximum height Rz is not less than 4 μm, a material ratio Rmr (c: Rz20%) is not less than 3.5% and a material ratio Rmr (c: Rz30%) is not more than 25%. The material ratio Rmr (c: Rz20%) means a material ratio Rmr(c) in the case where 20% of the maximum height Rz is set to a cutting level c, and the material ratio Rmr (c: Rz30%) means a material ratio Rmr(c) in the case where 30% of the maximum height Rz is set to the cutting level c.

Figure 3:
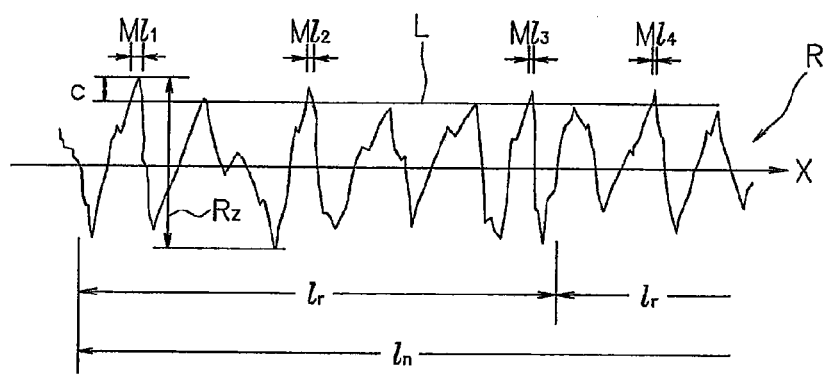
FIG. 3 is a diagram showing a roughness profile for explaining a maximum height Rz and a material ratio Rmr(c)

As shown in FIG. 3, the maximum height Rz is a sum of a maximum value of a peak height and a maximum value of a valley depth in the roughness profile R, and can be determined as an average value of measured data obtained per five continuous sampling lengths lr. The material ratio Rmr(c) is a ratio of a material length $M1(c)$ of a roughness profile element in the cutting level c with respect to an evaluation length ln, and the material ratio Rmr(c) is obtained by an equation Rmr(c)=material length $M1(c)$/evaluation length ln. The material length $M1(c)$ is a sum ($M1_1+M1_2+\ldots$) of lengths in a substantial side of the roughness profile elements which are cut by a straight line L of the cutting level c based on a position of a highest profile peak in the evaluation length ln.

The present invention specifies two material ratios Rmr(c) having different cutting levels c along with the maximum height Rz, with respect to the rough surface molding portion 1. One of the material ratios is a material ratio Rmr (c: Rz20%), and the other is a material ratio Rmr (c: Rz30%), both of which relate to a thickness in a leading end side of a profile peak of the roughness profile (a length in an X-axis direction). The present inventor has found that it is possible to effectively prevent a crack on a tire outer surface after a cure molding, while securing a flow property of rubber at the time of the cure molding, by forming the rough surface molding portion 1 in which the maximum height Rz and the material ratios Rmr(c) are set to the specific ranges.

In other words, in the rough surface molding portion 1 in which the maximum height Rz is not less than 4 μm, and the material ratio Rmr (c: Rz30%) is not more than 25%, a surface texture becomes correspondingly rough, and a leading end side of a profile peak of the roughness profile becomes appropriately narrow. Accordingly, a flow resistance of uncured rubber becomes smaller at the time of the cure molding, and it is possible to secure a flow property of the rubber. On the contrary, if the maximum height Rz is less than 4 μm, or the Rmr (c: Rz30%) goes beyond 25%, the rough surface molding portion is smoothened, and the flow resistance of the uncured rubber is increased. Therefore, a rubber flow defect is caused at the time of the cure molding, and an appearance fault may be generated in the tire outer surface.

At the same time, since the material ratio Rmr (c: Rz20%) is not less than 3.5% in the rough surface molding portion 1, it is possible to suppress sharpness of a micro convex portion included in the rough surface molding portion 1 in cooperation with the fact that the material ratio Rmr (c: Rz30%) is not more than 25%. In other words, it is possible to form the leading end somewhat gently by relaxing a taper of the profile peak of the roughness profile, while securing the roughness of the rough surface molding portion 1 based on a relative relationship of these material ratios Rmr(c). On the contrary, if the material ratio Rmr (c: Rz20%) is less than 3.5%, the profile peak of the roughness profile is tapered so as to become sharp, a deep and sharp micro concave portion is formed in a tire side by the micro convex portion of the rough surface molding portion, and a strain tends to be concentrated. Therefore, for example, if a strain repeatedly acts thereon in an ozone atmosphere, there is fear that a crack is generated starting from the position so as to appear on the tire outer surface.

The maximum height Rz of the rough surface molding portion 1 is preferably set between 4 and 30 μm for forming the rough surface molding portion 1 rough, is more preferably set between 8 and 20 μm, and is particularly preferably set between 10 and 15 μm. The material ratio Rmr (c: Rz20%) is below the material ratio Rmr (c: Rz30%), and is preferably set to be not less than 7% for reliably preventing the crack on the tire outer surface. The material ratio Rmr (c: Rz30%) is above the material ratio Rmr (c: Rz20%), and is preferably set to be not more than 20% for effectively securing the flow property of the rubber.

Since the region molding the side wall portion tends to generate the rubber flow defect, it is possible to accurately secure the flow property of the rubber so as to more reliably prevent generation of the adhesive failure by forming the rough surface molding portion 1 in the region such as the present embodiment. Since the rubber flow defect is particularly remarkable in a region (corresponding to a region 7 in FIG. 5) from a maximum width position of the tire to a rim line, it is desirable to form the rough surface molding portion 1 in at least the region of the tire molding surface 10. Of course, it is effective to form the rough surface molding portion 1 in an inner peripheral surface 12 of a side mold portion M2 or in an entire inner peripheral surface 11 of a tread mold portion M1, and the rough surface molding portion 1 may be formed in the entire tire molding surface 10.

The rough surface molding portion 1 is not particularly limited in its working method and a working condition, as far as the surface texture mentioned above can be obtained. As the working method of the rough surface molding portion 1, there can be exemplified a sandblast work of blowing sand or an abrasives, and an etching work of blowing an etching reagent having FeC13 as a main component or the like, and it is useful to lightly polish by a sandpaper or the like after these works.

FIG. 2 shows an example in which the rough surface molding portion 1 is formed uniformly in the tire circumferential direction, however, it may be formed non-uniformly. However, if the rough surface molding portion is formed non-uniformly such as the mold described in Japanese Unexamined Patent Publication No. H06-106921, it becomes difficult to control a parameter referring to the surface texture such as the maximum height Rz or the like, and an uncomfortable feeling may be given to the appearance by generating a difference in gloss on the outer surface of the tire. Accordingly, it is preferable that the rough surface molding portion 1 is formed uniformly.

When uniformly forming the rough surface molding portion 1 in a tire circumferential direction, it is preferable to extend a stripe line for work in the rough surface molding portion 1 spirally along the tire circumferential direction, by working while moving a tool in the tire circumferential direction. Accordingly, since the micro irregularity of the rough surface molding portion 1 extends in the spiral shape along the tire circumferential direction, it is possible to easily prevent the lightness on the outer surface of the tire from being generated, by efficiently discharging the air at the time of the cure molding.

Next, a description will be given of a manufacturing method of the pneumatic tire according to the present invention, however, since it can be carried out in the same manner as the conventional tire manufacturing steps except a step of cure molding the tire, a description will be given only of the cure molding step. The manufacturing method of the pneumatic tire has a step of cure molding the tire by using a mold M provided with the rough surface molding portion 1 as mentioned above in the tire molding surface 10.

Figure 4:
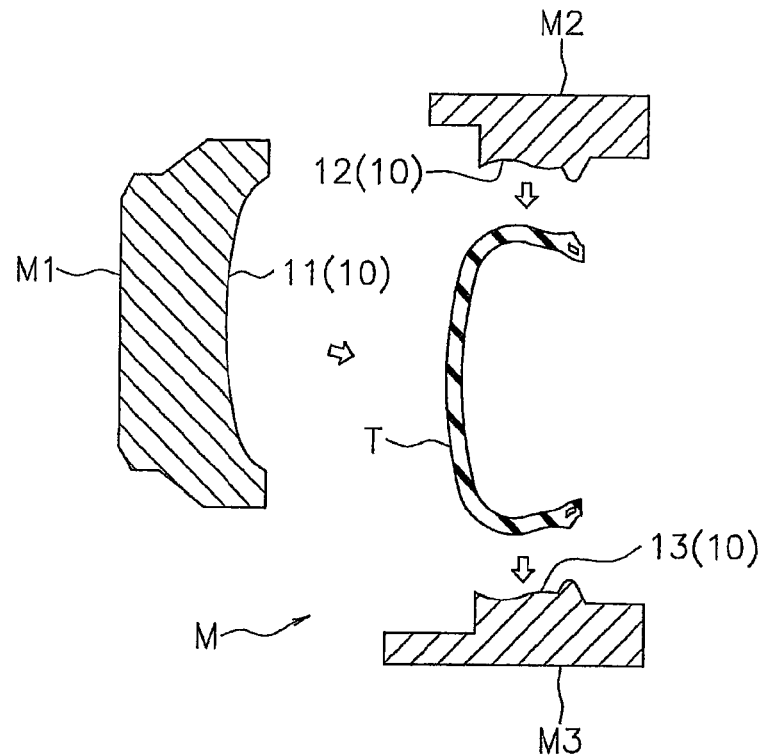
FIG. 4 is a cross sectional view explaining a setting of an uncured tire to the tire mold.

In the cure molding step, the uncured tire T before the cure molding is set as shown in FIG. 4, the tire molding surface 10 is thereafter pressed against the outer surface of the tire by clamping the mold M as shown in FIG. 1, and heat and pressure are applied to the tire T. At this time, since the flow property of the rubber is secured as mentioned above in the rough surface molding portion 1, it is possible to suppress the generation of the appearance fault such as the adhesive failure or the like due to the rubber flow defect, in the tire T after being molded. Further, on the outer surface of the tire T, the rough surface molding portion 1 is transcribed, and the rough surface portion in which the micro concave portion becomes comparatively gentle is formed, whereby it is possible to effectively prevent the crack on the tire outer surface from being generated.

Figure 5:
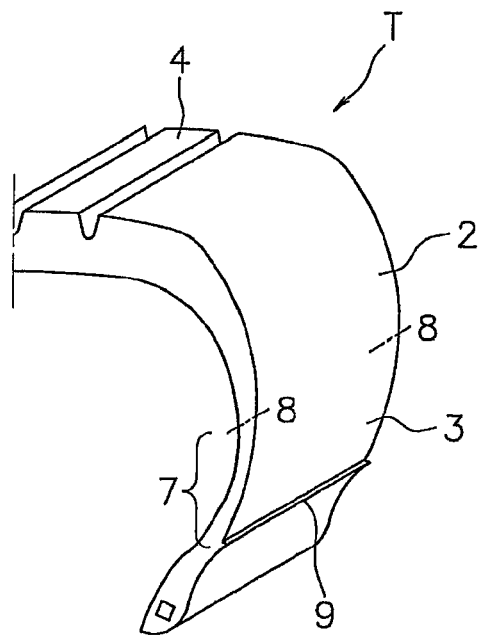
FIG. 5 is a perspective view showing one example of a pneumatic tire according to the present invention.
Figure 6:
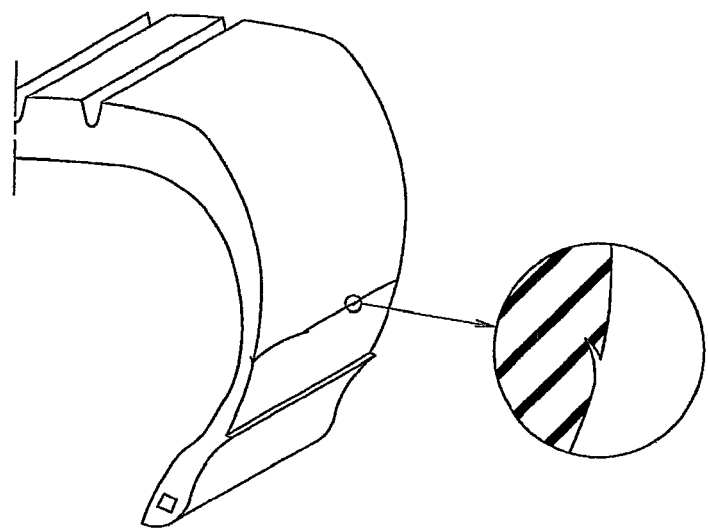
FIG. 6 is a perspective view of a pneumatic tire for explaining an adhesive failure.

The pneumatic tire T manufactured via the cure molding step as mentioned above is provided with the rough surface portion 2 in its outer surface as shown in FIG. 5. Since the rough surface portion 2 is molded by transcribing the rough surface molding portion 1, in the surface texture thereof, the maximum height Rz is not less than 4 μm, and the material ratio Rmr (c: Rz20%) is not less than 3.5% and the material ratio Rmr (c: Rz30%) is not more than 25%, with regard to the positively and negatively inverted roughness profile.

Both the material ratios Rmr(c) are defined by the positively and negatively inverted roughness profile, because the substance side of the roughness profile becomes contrary between the rough surface molding portion 1 and the rough surface portion 2. In other words, in the case where a roughness profile R in FIG. 3 is obtained in the rough surface molding portion 1 of the mold M, the roughness profile in which the upper part of FIG. 3 comes to the substance side is obtained in the rough surface portion 2 which is molded by the rough surface molding portion 1. Therefore, the material ratio Rmr(c) is defined by the roughness profile which is inverted around a roughness mean line (the X-axis).

In this pneumatic tire T, since the rough surface portion 2 having the surface texture as mentioned above is provided in the outer surface, the flow property of the rubber is secured in the rough surface portion 2 at the time of the cure molding, and the appearance fault such as the adhesive failure or the like is prevented. At the same time, since the sharpness of the micro concave portion is gentle in the tire outer surface, it is possible to effectively prevent the crack from being generated. The pneumatic tire T is provided with a side wall portions 3 extending outward in a tire diametrical direction from a bead portion seating on a rim, and a tread portion 4 configuring a tread surface while being connected to an outer end of the side wall portions 3. The pneumatic tire can be constructed in the same manner as the normal pneumatic tire except for being provided with a rough surface portion 2, and is provided with a carcass and a belt which are not illustrated, in its inside.

In the present embodiment, since the rough surface portion 2 is formed in the outer surface of the side wall portion 3 as shown in FIG. 5, it is possible to accurately dissolve the rubber flow defect in the position at which the adhesive failure is significantly generated, and it is possible to effectively prevent the generation of the appearance fault. Since such a rubber flow defect is particularly remarkable in a region 7 from a maximum width position 8 of the tire T to a rim line 9, it is desirable to form the rough surface portion 2 at least in the region 7. Of course, it is optional to form the rough surface portion 2 on the outer surface of the other position such as the tread portion 4 or the like.

The present invention is not limited to the embodiment mentioned above, but can be variously modified and changed within the scope of the present invention. In the embodiment mentioned above, there is shown the example in which the tire molding surface is constructed by three mold portions, however, the structure is not limited thereto, and it may be constructed, for example, by a pair of mold portions which are divided into two sections in the center of the tread portion. Further, an inner side in the tire diametrical direction of the side mold portion may be provided with a bead ring fitting the bead portion of the tire as an independent member.

EXAMPLE

In order to specifically show the structure and the effect of the present invention, an appearance fault and a generation condition of a crack were evaluated after a cure molding by using a mold of a tire size 11R22.5. In the used mold, a rough surface molding portion was formed in a region molding a side wall portion as shown in FIG. 2, and its surface texture was variously changed.

As an evaluation with respect to the appearance fault, the tires after the cure molding were observed in increments of twenty, and presence or absence of the adhesive failure (the rubber interface) or the generation of the lightness due to the rubber flow defect was searched. In the evaluation, a state in which the concave portion was apparently formed was set to x, a state in which no adhesive failure was confirmed by scratching a tire outer surface, but a stripe-shaped rubber interface could be recognized was set to Δ, and a state in which the rubber interface could not be recognized and no problem was generated was set to ○.

Further, a crack test was carried out by using three tires after the cure molding. In the crack test, a length of the crack was measured after traveling for 400 hours, by rotating the tire in which 70% of a normal internal pressure described in standard (JATMA, TRA or the like) to which the tire is applied is filled, and to which a load which is 120% of a normal load is applied, on a drum at a speed of 40 km/h under an ambient atmosphere having an ozone concentration 40 pphm. In the evaluation, focusing on a circumferential length of each of cracks and wrinkles appearing in a region from a bead portion to a tire maximum cross sectional width position, a state in which the circumferential length was not less than 10 mm was set to x, a state in which it was more than 2 mm and less than 10 mm was set to Δ, and a state in which it was not more than 2 mm was set to ○.

TABLE 1

|  | Maximum height Rz (μm) | Material ratio Rmr (c) (%) | | Appearance fault | Crack test |
|---|---|---|---|---|---|
|  |  | C:Rz20% | C:Rz30% |  |  |
| Evaluation example 1 | 2 |  |  | x | ○ |
| Evaluation example 2 | 4 | 7.5 | 50 | x | ○ |
| Evaluation example 3 | 8 | 1.2 | 40 | x | x |
| Evaluation example 4 | 15 | 3.5 | 15 | ○ | Δ |
| Evaluation example 5 | 25 | 1.2 | 25 | Δ | x |
| Evaluation example 6 | 30 | 5.0 | 40 | x | ○ |
| Evaluation example 7 | 4 | 1.2 | 10 | ○ | x |
| Evaluation example 8 | 4 | 3.5 | 15 | ○ | ○ |
| Evaluation example 9 | 10 | 10.0 | 25 | Δ | ○ |
| Evaluation example 10 | 4 | 5.0 | 35 | x | ○ |
| Evaluation example 11 | 4 | 1.2 | 40 | x | x |

As shown in Table 1, if the maximum height Rz is less than 4 μm, the rubber flow defect is caused, and the appearance fault tends to be generated (Evaluation example 1). Further, if the material ratio Rmr (c: Rz20%) is less than 3.5%, the crack on the tire outer surface tends to be generated (Evaluation examples 3, 5, 7 and 11). In the case where Rmr (c: Rz30%) is over 25%, the rubber flow defect is caused and the appearance fault tends to be generated (Evaluation examples 2, 3, 6, 10 and 11). On the contrary, if the maximum height Rz, the material ratio Rmr (c: Rz20%) and the material ratio Rmr (c: Rz30%) are set to the specific ranges, it is possible to effectively prevent the crack on the tire outer surface while securing the flow property of the rubber (Evaluation examples 4, 8 and 9).

What is claimed is:

1. A tire mold comprising:
   a tire molding surface; and
   a rough surface molding portion provided in the tire molding surface, wherein
   the rough surface molding portion is structured such that a maximum height Rz is not less than 4 μm, a material ratio Rmr(c) in a case where 20% of the maximum height Rz is set to a cutting level c is not less than 3.5%, and a material ratio Rmr(c) in a case where 30% of the maximum height Rz is set to the cutting level c is not more than 25%.

2. The tire mold according to claim 1, wherein the rough surface molding portion is formed in a region molding a side wall portion of the tire molding surface.

* * * * *